(12) United States Patent
Murata et al.

(10) Patent No.: US 7,139,088 B2
(45) Date of Patent: Nov. 21, 2006

(54) COMMUNICATION APPARATUS AND COMMUNICATION METHOD

(75) Inventors: Yukio Murata, Chiba (JP); Takehiro Yoshida, Tokyo (JP); Yoshio Yoshiura, Kanagawa (JP); Shigeo Miura, Tokyo (JP); Shunichi Fujise, Chiba (JP); Daisuke Suga, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 904 days.

(21) Appl. No.: 09/905,954

(22) Filed: Jul. 17, 2001

(65) Prior Publication Data
US 2002/0015181 A1 Feb. 7, 2002

(30) Foreign Application Priority Data
Jul. 25, 2000 (JP) ............................. 2000-223703

(51) Int. Cl.
*G06F 3/12* (2006.01)
*G06F 15/00* (2006.01)
*G06K 1/00* (2006.01)

(52) U.S. Cl. ..................... 358/1.15; 358/400; 358/402; 358/407; 709/227; 709/231; 709/237

(58) Field of Classification Search ................ 358/1.15
See application file for complete search history.

(56) References Cited

U.S. PATENT DOCUMENTS

| 4,885,755 | A |  | 12/1989 | Yoshida ......................... 375/58 |
| 5,079,765 | A | * | 1/1992 | Nakamura .................. 370/401 |
| 5,307,179 | A |  | 4/1994 | Yoshida ....................... 358/440 |
| 5,748,334 | A |  | 5/1998 | Yoshida ....................... 358/435 |
| 5,946,104 | A |  | 8/1999 | Yoshida ....................... 358/412 |
| 6,094,277 | A | * | 7/2000 | Toyoda ....................... 358/1.15 |
| 6,463,135 | B1 | * | 10/2002 | Abrishami et al. .... 379/100.01 |

FOREIGN PATENT DOCUMENTS

| JP | 2000-004345 | 1/2000 |
| JP | 2000-184118 | 6/2000 |

* cited by examiner

*Primary Examiner*—Twyler M. Lamb
*Assistant Examiner*—Yixing Qin
(74) *Attorney, Agent, or Firm*—Fitzpatrick, Cella, Harper & Scinto

(57) ABSTRACT

When a data communication apparatus as a sender gateway receives instruction information for instructing a communication system via ITU recommendation T.38 or a communication system via ITU recommendation T.37 from a sender facsimile apparatus as an analogue communication terminal, data communication is executed with respect to a recipient connected gateway on the basis of the communication system instructed by the instruction information.

20 Claims, 4 Drawing Sheets

COMMUNICATION APPARATUS AND COMMUNICATION METHOD

BACKGROUND OF THE INVENTION

1. Field of the Invention

The present invention relates to a data communication apparatus, a communication system switching method and a memory medium, and more particularly it relates to a data communication apparatus including analogue terminal communication means for effecting communication with an analogue terminal and data communication network connecting means for effecting connection to a data communication network, a communication system switching method applied to such a data communication apparatus, and a memory medium storing a program for executing such a communication system switching method.

2. Related Background Art

Recently, data communication utilizing internets has been progressed remarkably.

There have been proposed ITU recommendation H.323 for effecting real time communication of video data or voice data by utilizing an internet and ITU recommendation T.38 for effecting real time facsimile communication by utilizing an internet. Further, ITU recommendation T.37 in which facsimile data is converted into a TIFF file which is in turn sent through an E-mail has also been proposed. In apparatus utilizing such techniques, the communication can be realized via the internet inexpensively. In the ITU recommendation T.38, since a sending terminal directly performs sending/receiving of data with respect to a terminal which ultimately receives the data, transmission of data can be recognized at real time.

FIG. 4 shows an example of a construction of a conventional communication system based on the ITU recommendation T.38 for effecting real time facsimile communication by utilizing the internet.

In FIG. 4, the system includes an Internet 101, a sender facsimile apparatus 102, a receiver facsimile apparatus 103, a sender gateway (GW) 104 and a receiver GW 105. The sender GW 104 and the receiver GW 105 are connected to the internet 101 to effect data communication through the internet 101. Further, the sender facsimile apparatus 102 and the receiver facsimile apparatus 103 are generally used G3 facsimile apparatuses, which are generally connected to analogue public networks (PSTN) 106, 107, respectively to effect facsimile sending or facsimile receiving of image information. The sender facsimile apparatus 102 is connected to the sender GW 104 via the PSTN 106 and the receiver facsimile apparatus 103 is connected to the receiver GW 105 via the PSTN 107, so that real time internet facsimile communication of the image information can be performed from the sender facsimile apparatus 102 to the receiver facsimile apparatus 103 through the sender GW 104, internet 101 and receiver GW 105.

FIG. 5 is a view showing a communication sequence performed when the image information is sent from the sender facsimile apparatus 102 to the receiver facsimile apparatus 103 in the conventional communication system shown in FIG. 4.

First of all, the sender facsimile apparatus 102 effects off-hook and dial operation to call out the sender GW 104. The sender GW 104 detects the call-out and responds thereto. When the off-hook is established, the sender GW 104 is connected to the sender facsimile apparatus 102 as the analogue terminal via the PSTN 106 (step 110).

The sender GW 104 designates a receiver GW 105 connected to the internet 101 and sends data packet comprised of a call establishment signal to the designated receiver GW 105 through the internet 101 (step 111). The call establishment signal includes information for designating a receiver facsimile apparatus 103 as a facsimile recipient. When the receiver GW 105 receives the call establishment signal packet, the receiver GW 105 designates the receiver facsimile apparatus 103 and connects thereto (step 112). The receiver GW 105 detects such connection and sends the data packet comprised of the call establishment signal to the sender GW 104 through the internet 101 (step 113). By such a sequence, the sender GW 104 and the receiver GW 105 connects a FAX channel therebetween through the internet 101 (step 114), so that an operation of T.38 session defined by the ITU T.38 is permitted in the sender facsimile apparatus 102, sender GW 104, receiver GW 105 and receiver facsimile apparatus 103 (step 115) and the image information can be sent from the sender facsimile apparatus 102 to the receiver facsimile apparatus 103.

When the facsimile sending operation is finished, since the sender facsimile apparatus 102 effects an on hook operation, the sender GW 104 detects such operation and effects disconnection from the sender facsimile apparatus 102 (step 116) and further sends data packet comprised of a release completion signal to the receiver GW 105 through the internet 101 (step 117). When the release completion signal packet is received, the receiver GW 105 sends busy tone to the receiver facsimile apparatus 103 (step 118), and the receiver facsimile apparatus 103 effects the on-hook operation accordingly (step 119).

In this way, the sequence of the real time internet facsimile communication is ended.

In the gateway (GW) for effecting the communication by the real time system (T.38), since the communication system is fixed and is not flexible, for example, a service such as the ITU recommendation T.37 in which the data of facsimile original is developed as the TIFF file which is in turn sent through the E-mail cannot be utilized.

SUMMARY OF THE INVENTION

The present invention is made in consideration of the above-mentioned conventional drawback, and an object of the present invention is to provide a data communication apparatus, a communication system switching method and a memory medium, by which facsimile communication utilizing an internet is made possible regardless of a communication system.

To achieve the above object, according to a first aspect of the present invention, there is provided a data communication apparatus including an analogue terminal communication unit for effecting communication with an analogue communication terminal and a data communication network connecting unit for effecting connection to a data communication network. The apparatus further includes a call establishment requesting unit for requesting call establishment via a first communication system with respect to the data communication network, when a sending request is received from the analogue communication terminal, and a communication executing unit for executing communication via a second communication system different from the first communication system with respect to the data communication network without disconnecting the communication with the analogue communication terminal, when a notice indicating that call establishment is possible is not received from the data communication network with respect to the call establishment request given by the call establishment requesting unit.

According to a second aspect of the present invention, there is provided a data communication apparatus including a communication unit for effecting communication with another communication terminal and a communication network connecting unit for effecting connection to a communication network. The apparatus includes a call establishment requesting unit for requesting call establishment via a first communication system with respect to the communication network, when a sending request is received from the other communication terminal; and a communication executing unit for responding, when a notice indicating that call establishment is possible is received from the communication network with respect to the call establishment request by the call establishment requesting unit, to the sending request from the other communication terminal by continuing the communication via the first communication system with respect to the communication network, and for responding, when a notice indicating that call establishment is possible is not received from the communication network, to the sending request from the other communication terminal by switching the communication via the first communication system to the communication via a second communication system different from the first communication system and continuing the switched communication with respect to the communication network without disconnecting the communication with the other communication terminal.

According to another aspect of the present invention, there is provided a communication apparatus including a communication unit for effecting communication with another communication terminal and a communication network connecting unit for effecting connection to a data communication network. The apparatus includes a call establishment requesting unit for requesting call establishment via a first communication system with respect to the data communication network, when a sending request is received from the other communication terminal. Also included is a communication executing unit for causing, when a notice indicating that call establishment is possible is received from the data communication network with respect to the call establishment request by the call establishment requesting unit, to effect the communication between the other communication terminal and the data communication network by continuing the communication via the first communication system with respect to the data communication network, and for, when a notice indicating that call establishment is possible is not received from the data communication network, switching the communication via the first communication system to the communication via a second communication system different from the first communication system with respect to the data communication network, receiving the data sent from the other communication terminal by the communication unit, converting the sent data into an electronic mail, and sending the electronic mail to the data communication network.

The other objects and features of the present invention will be apparent from the following detailed explanation of the invention referring to the accompanying drawings.

DESCRIPTION OF THE PREFERRED EMBODIMENTS

The present invention will now be explained in connection with embodiment thereof with reference to the accompanying drawings.

(First Embodiment)

Figure 1:
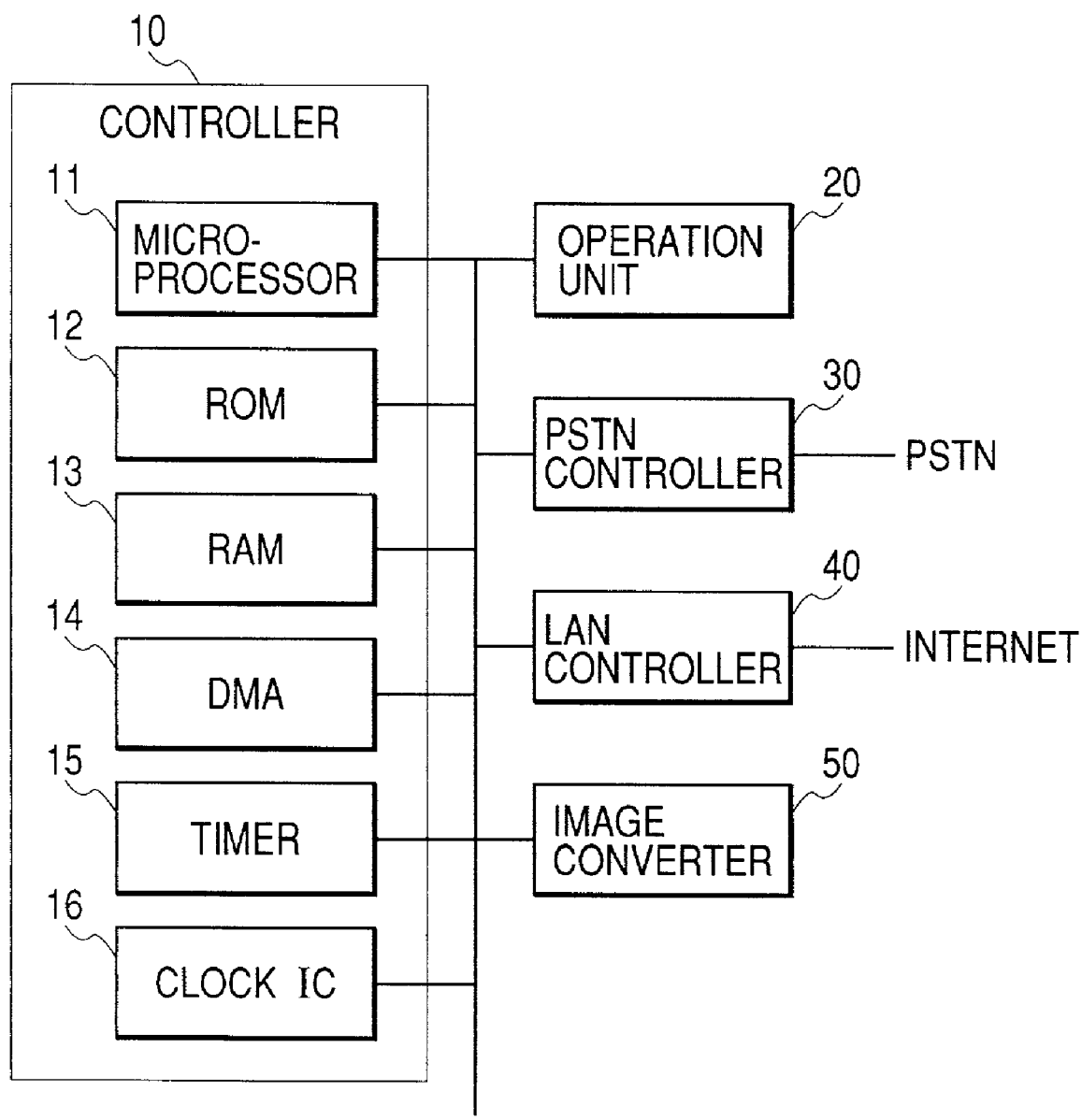
FIG. 1 is a block diagram showing a construction of a data communication apparatus according to a first embodiment of the present invention.

FIG. 1 is a block diagram showing a construction of a data communication apparatus according to a first embodiment of the present invention. The data communication apparatus is a gateway (GW) apparatus.

In FIG. 1, a controller 10 for controlling the entire data communication apparatus is constituted by a micro-computer circuit including a microprocessor 11, a ROM 12, a RAM 13, a DMA controller 14, a timer 15 and a clock IC 16. In the controller 10, by executing a control program stored in the ROM 12 by using the microprocessor 11, an operation of the entire data communication apparatus is controlled and various data are managed.

An operation unit 20 is constituted by various keys and displays and serves to receive operator's key input and to display various informations. A PSTN controller 30 is constituted by a PSTN interface, a Modem and a phone circuit and serves to effect sending/receiving of image data and communication control data via a PSTN as an analogue circuit and both-way call control of a phone.

A LAN controller 40 is connected to an internet and serves to effect sending/receiving of a digital signal as a packet such as TCP/IP and to control communication of E-mail (ITU recommendation T.37) and real time communication (ITU recommendation T.38). An image converter 50 serves to convert compression code data such as MH, MR, MMR or JBIG as facsimile image data received in the PSTN controller 30 into raw image data and to further convert it into TIFF format data.

Next, facsimile sending processing effected in the data communication apparatus constituted as mentioned above will be explained with reference to FIG. 2.

Figure 2:
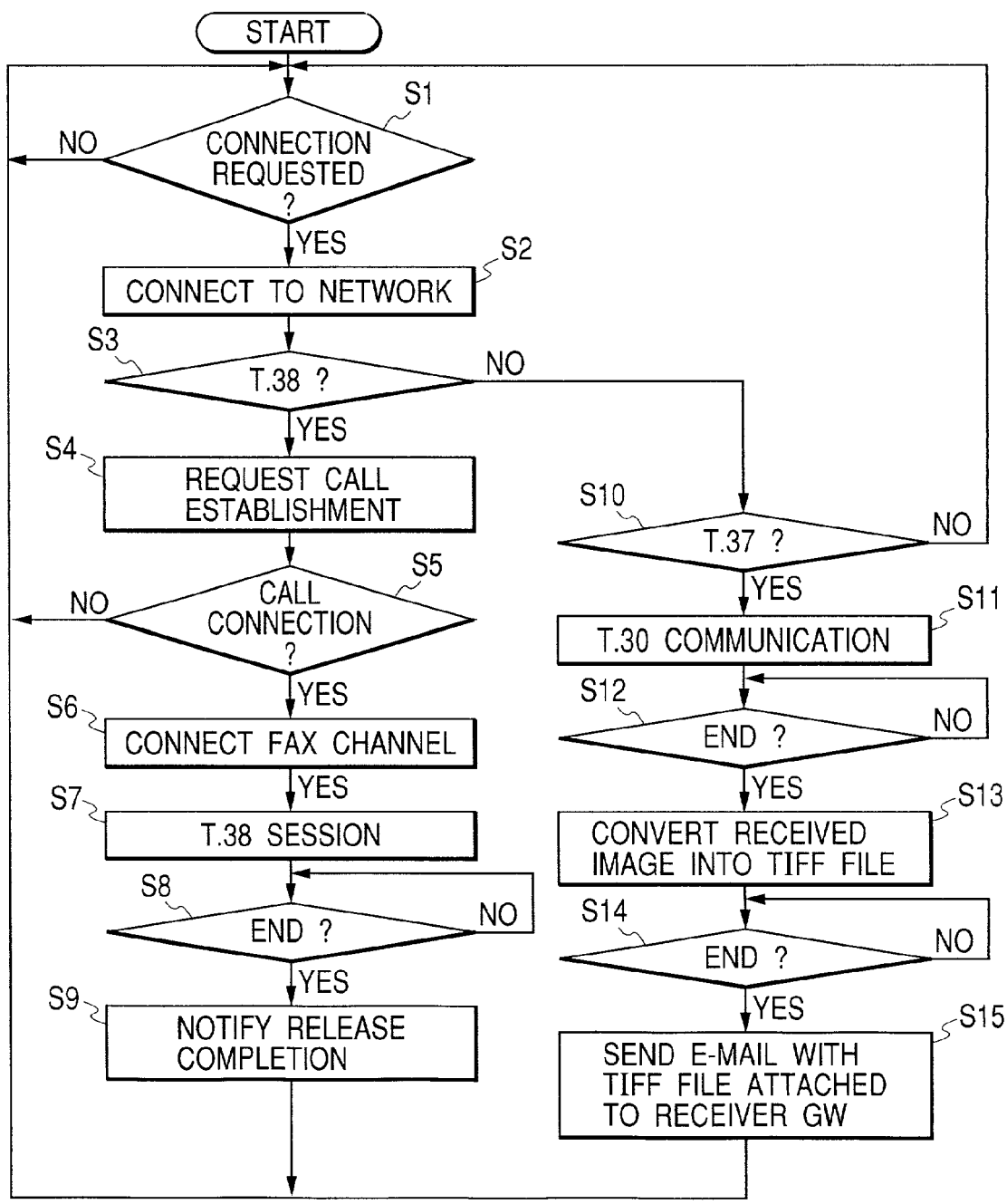
FIG. 2 is a flow chart showing a sequence of facsimile communication processing executed by a controller of the data communication apparatus according to the first embodiment.

FIG. 2 is a flow chart showing a sequence of facsimile communication processing executed by the controller 10 of the data communication apparatus. Incidentally, a sender facsimile apparatus serves to notify instruction information for instructing the communication system as either ITU recommendation T.38 or ITU recommendation T.37 through DTMF, as well as connection GW information and recipient information. The data communication apparatus as the gateway (GW) apparatus installed at the sender side serves to receive such informations and to selectively execute the system selected among the communication via the ITU recommendation T.38 and the communication via the ITU recommendation T.37.

If connection is requested from the PSTN through the PSTN controller 30 (YES in a step Si in FIG. 2), the circuit is connected to the network (step S2). Then, it is judged whether the communication via the ITU recommendation T.38 is requested or not on the basis of the instruction information notified from the connected sender facsimile apparatus (step S3). If the communication via the ITU recommendation T.38 is requested, the program goes to a step S4; whereas, if not requested, the program goes to a step S10.

If the communication via the ITU recommendation T.38 is requested and the program goes to the step S4, call establishment is requested to the connected GW via the LAN controller 40 on the basis of the connection GW information (step S4). As a result, if call connection response is received from the connected GW (YES in a step S5), a FAX channel is connected to the connected GW (step S6). After the FAX channel is connected, the image data received from the sender facsimile apparatus is sent to the connected GW by T.38 session (step S7). If the sending is finished (YES in a step S8), release completion notice is sent to the receiver GW to release the connection (step S9) and then the program is returned to the step S1.

On the other hand, when the program goes to the step S10, it is judged whether the communication via the ITU recommendation T.37 is requested or not on the basis of the instruction information notified from the sender facsimile apparatus. If the communication via the ITU recommendation T.37 is requested, the program goes to a step S11; whereas, if not requested, the program is returned to the step S1. In the step S11, image communication via ITU recommendation T.30 is effected with respect to the connected sender facsimile apparatus (step S11). If the image communication is finished (YES in a step S12), the received image data is converted into TIFF format data (step S13). If the conversion is finished (YES in a step S14), the converted TIFF format data is attached to E-mail and is sent to the receiver GW through the LAN controller 40. Then, the program is returned to the step S1.

In this way, according to the first embodiment, the data communication apparatus as the sender GW can selectively switch the communication via the ITU recommendation T.38 and the communication via the ITU recommendation T.37 on the basis of the instruction information from the sender facsimile apparatus, and, accordingly, so long as the instruction information is set in accordance with sender side user's sending purpose or the communication system of the connected GW, the sender GW can automatically select the proper communication system.

(Second Embodiment)

Next, a second embodiment of the present invention will be explained.

Since a fundamental construction of the second embodiment is substantially the same as that of the first embodiment, in the explanation of the second embodiment, the construction of the first embodiment is invoked.

Figure 3:
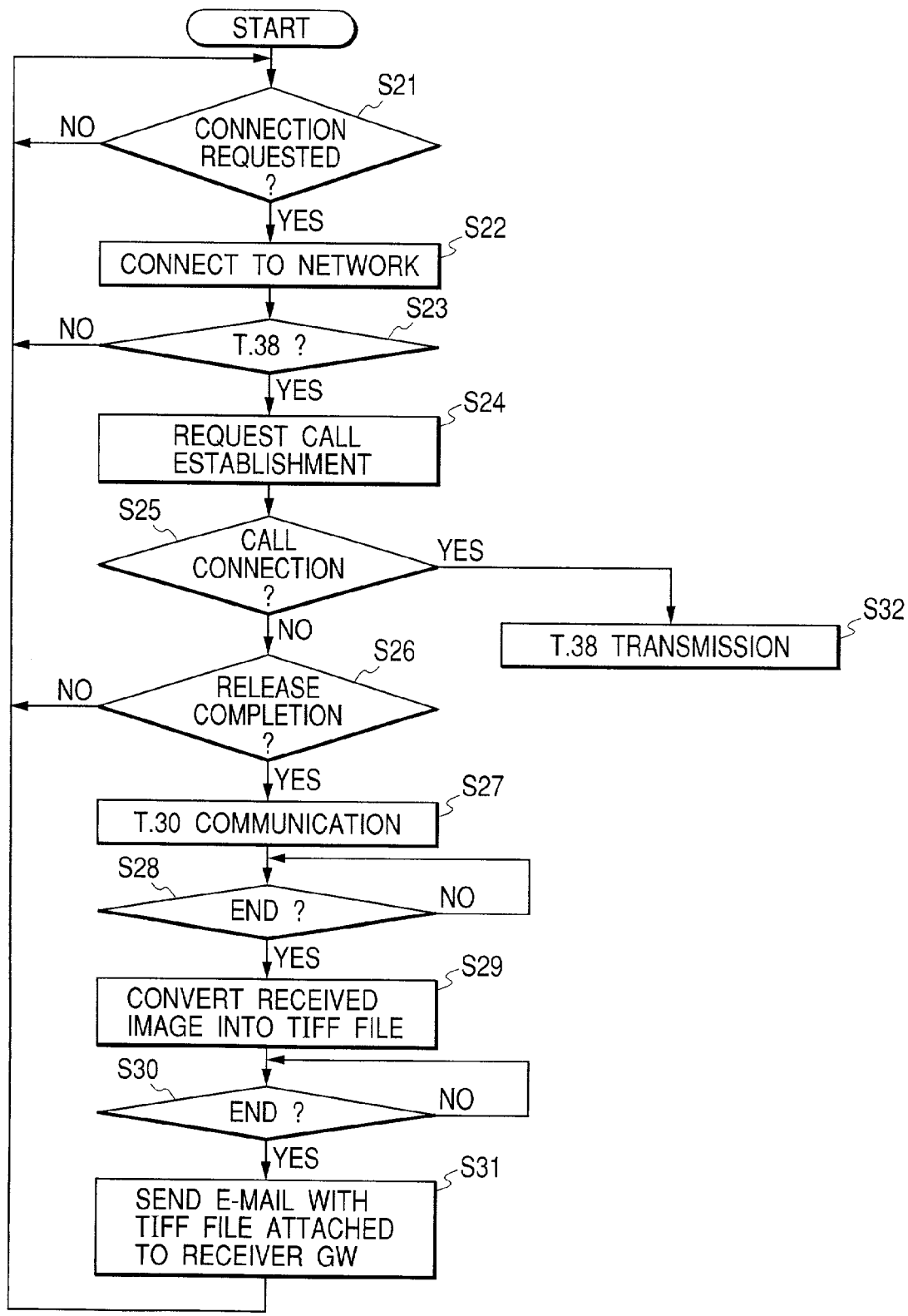
FIG. 3 is a flow chart showing a sequence of facsimile communication processing executed by a controller of a data communication apparatus according to a second embodiment of the present invention.
Figure 4:
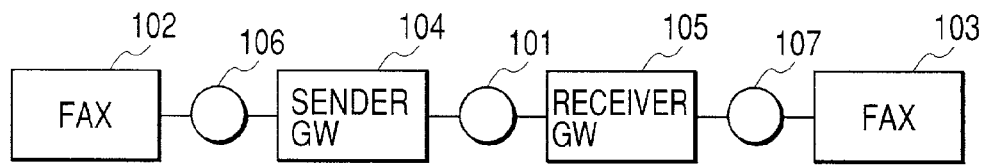
FIG. 4 is a view showing an example of a construction of a conventional communication system based on ITU recommendation T.38 for effecting real time facsimile communication by utilizing an internet.
Figure 5:
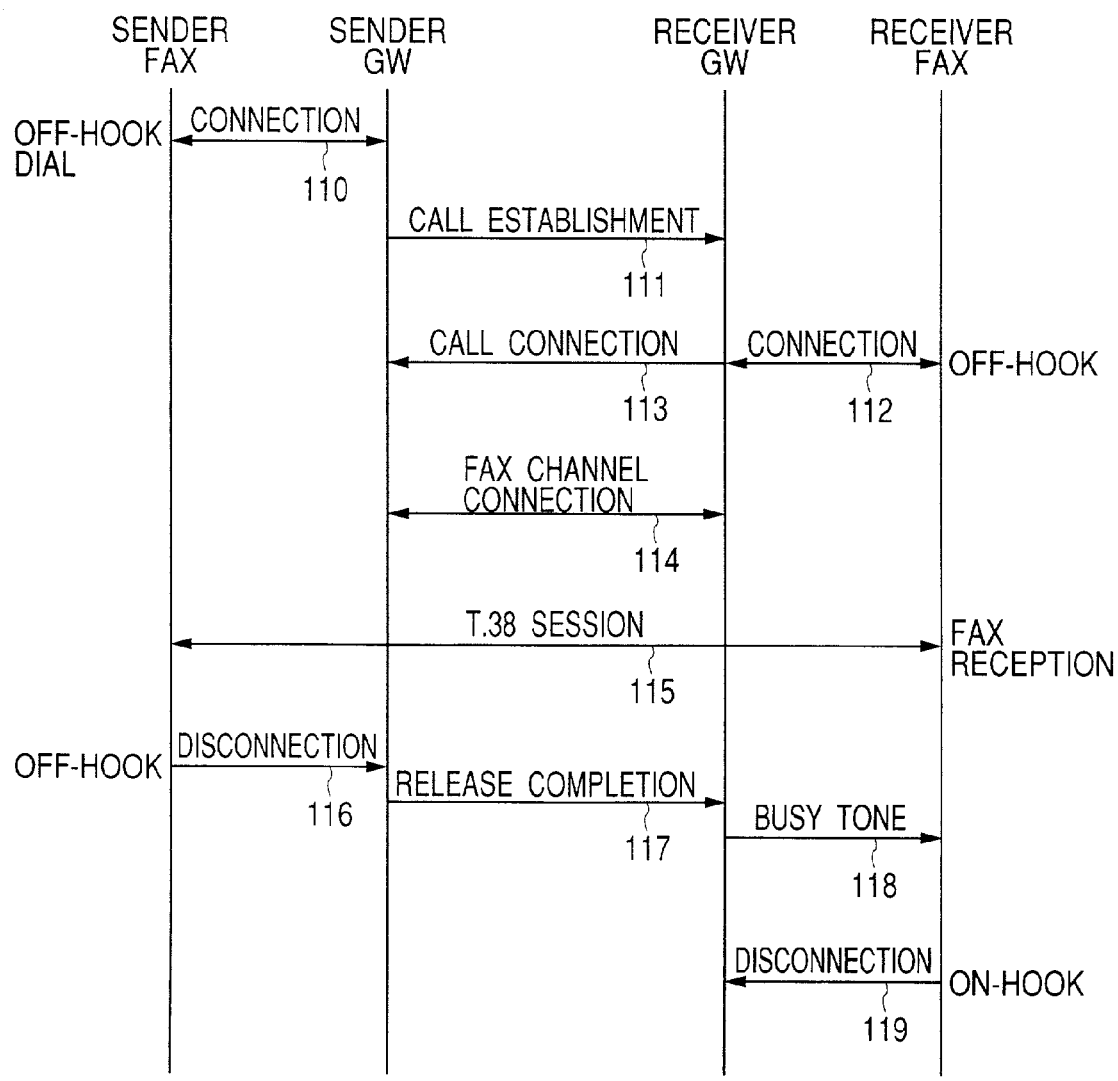
FIG. 5 is a view showing a communication sequence performed when image information is sent from a sender facsimile apparatus to a receiver facsimile apparatus in the conventional communication system shown in FIG. 4.

FIG. 3 is a flow chart showing a sequence of facsimile communication processing executed by a controller 10 of a data communication apparatus according to the second embodiment. In the second embodiment, in accordance with the communication system of the receiver GW, the data communication apparatus as the sender GW executes sending via ITU recommendation T.38 or sending via ITU recommendation T.37.

If connection is requested from the PSTN through the PSTN controller 30 (YES in a step S21 in FIG. 3), the circuit is connected to the network (step S22) to start the communication via the ITU recommendation T.38. If such communication cannot be started (NO in a step S23), the program is returned to the step S21; whereas, if the communication can be started (YES in the step S23), the program goes to a step S24.

In the step S24, call establishment is requested to the connected GW via the LAN controller 40 on the basis of the connection GW information sent from the sender facsimile apparatus (step S24). If call establishment response is sent from the connected GW (YES in a step S25), the communication via the ITU recommendation T.38 is effected (step S32). That is to say, although not shown, the same processing sequences as those in the steps S6 to S9 in FIG. 2 are effected, and then, the program is returned to the step S21.

On the other hand, if the call establishment response is not sent from the connected GW (NO in the step S25) and release completion notice is sent from the connected GW (YES in a step S26), it is judged that the connected GW is a gateway which cannot execute the communication via the ITU recommendation T.38, the communication via the ITU recommendation T.37 is effected with respect to the connected GW. Incidentally, if not only the call establishment response but also the release completion notice are not sent from the connected GW (NO in the step S26), the program is returned to the step S21.

In the communication via the ITU recommendation T.37, first of all, image communication via ITU recommendation T.30 is effected with respect to the sender facsimile apparatus (step S27). If the image communication is finished (YES in a step S28), the received image data is converted into TIFF format data (step S29). If the conversion is finished (YES in a step S30), the converted TIFF format data is attached to E-mail and is sent to the receiver GW through the LAN controller 40 (step S31). Then, the program is returned to the step S21.

As mentioned above, if the communication via the ITU recommendation T.38 can be effected with respect to the receiver GW, the sender GW executes the communication via the ITU recommendation T.38. On the other hand, if the communication via the ITU recommendation T.38 cannot be effected with respect to the receiver GW, the sender GW automatically switch to the communication via the ITU recommendation T.37 and executes the communication to the receiver GW. Accordingly, in the sender GW, the sending can be effected regardless of the communication system, and, in the second embodiment, the inputting operation for the instruction information regarding the communication system which must be performed by the operator of the sender facsimile apparatus in the first embodiment can be omitted or eliminated.

Incidentally, it should be noted that the present invention can be achieved by supplying a memory medium storing a program code of software for executing the functions of the above-mentioned embodiments to the system or the apparatus and by reading out and executing the program code stored in the memory medium by means of a computer (or CPU or MPU) of the system or the apparatus.

In this case, the program code itself read out from the memory medium realizes the functions of the above-mentioned embodiments, and, thus, the memory medium storing such program code constitutes the present invention.

As the memory medium for supplying the program code, for example, a floppy disk, a hard disk, an optical disk, a photo-magnetic disk, CD-ROM, CD-R, a magnetic tape, a non-volatile memory card or ROM can be used.

Further, it should be noted that not only the present invention includes a concept that the functions of the above-mentioned embodiments are realized by executing the read out program code read by means of the computer, but also OS running on the computer executes the actual processing partially or totally on the basis of instruction of the program code to realize the functions of the embodiments.

Further, it should be noted that the present invention includes a concept that, after the program code read out from the memory medium is written in a memory of a function expansion board inserted into the computer or a function expansion unit connected to the computer, a CPU of the function expansion board or of the function expansion unit executes the actual processing partially or totally on the basis of instruction of the program code to realize the functions of the embodiments.

As fully mentioned above, according to the first embodiment of the present invention, when the instruction information for instructing the communication system in the data communication network is received from the analogue communication terminal, the data communication in the data communication network is executed by the communication system instructed by the instruction information.

As a result, the data communication apparatus as the sender gateway can selectively switch the communication via the ITU recommendation T.38 and the communication via the ITU recommendation T.37 on the basis of the instruction information from the sender facsimile apparatus as the analogue communication terminal, and, accordingly, so long as the instruction information is set in accordance with sender side user's sending purpose or the communication system of the connected GW, the sender GW can automatically select the proper communication system.

Further, according to the second embodiment of the present invention, when the sending request is received from the analogue communication terminal, the call establishment via the first communication system is requested to the data communication network. For such call establishment request, when the notice indicating the call establishment impossible is received from the data communication network, the communication is effected via the second communication system different from the first communication system with respect to the data communication network.

In this way, if the communication via the ITU recommendation T.38 as the first communication system can be effected between the data communication apparatus as the sender gateway and the receiver GW of the data communication network, the sender GW executes the communication via the ITU recommendation T.38. On the other hand, if the communication via the ITU recommendation T.38 cannot be effected with respect to the receiver GW, the sender GW automatically switch to the communication via the ITU recommendation T.37 as the second communication system and executes the communication to the receiver GW. Accordingly, in the sender GW, the sending can be effected regardless of the communication system, and the operator's inputting operation for the instruction information regarding the communication system can be omitted or eliminated.

In this way, the facsimile communication utilizing the internet can be effected regardless of the communication system.

What is claimed is:

1. A communication apparatus including an analogue terminal communication unit for effecting communication through an analogue circuit with an analogue communication terminal and a data communication network connecting unit for effecting connection to a data communication network, further comprising:
   a requesting unit adapted to request call establishment to the data communication network via a first communication system, when a sending request is received from the analogue communication terminal through the analogue circuit;
   a receiving unit adapted to receive a notice indicating that call establishment is possible from the data communication network corresponding to the call establishment request; and
   a communication executing unit adapted to execute the communication with the data communication network via a second communication system by switching the first communication system to the second communication system different from said first communication system and adapted to continue the communication with the analogue communication terminal without disconnecting the communication of the analogue circuit, when the notice is not received by said receiving unit.

2. A communication apparatus according to claim 1, wherein said communication executing unit adapted to execute the communication via the second communication system, when a release completion notice is received from the data communication network.

3. A communication apparatus according to claim 1, wherein said analogue communication terminal is a facsimile apparatus and said communication apparatus is a gateway apparatus.

4. A communication apparatus according to claim 1, wherein said data communication network is an internet.

5. A communication apparatus according to claim 1, wherein said first communication system is a communication system via ITU recommendation T.38 and said second communication system is a communication system via ITU recommendation T.37.

6. A communication apparatus according to claim 1, wherein an analogue signal received by said analogue terminal communication unit from said analogue communication terminal is converted into a data packet signal having a predetermined type and the converted signal is sent from said data communication network connecting unit to said data communication network.

7. A communication system switching method applied to a communication apparatus including an analogue terminal communication unit for effecting communication through an analogue circuit with an analogue communication terminal and a data communication network connecting unit for effecting connection to a data communication network, comprising:
   a requesting step of requesting call establishment to the data communication network via a first communication system, when a sending request is received from the analogue communication terminal through the analogue circuit;
   a receiving step of receiving a notice indicating that call establishment is possible from the data communication network corresponding to the call establishment request; and
   a communication executing step of executing the communication with the data communication network via a second communication system by switching the first communication system to the second communication system different from the first communication system and continuing the communication with the analogue communication terminal without disconnecting the communication of the analogue circuit, when the notice is not received in said receiving step.

8. A communication system switching method according to claim 7, wherein said communication executing step executes communication via the second communication system, when a release completion notice is received from the data communication network.

9. A communication system switching method according to claim 7, wherein the analogue communication terminal is a facsimile apparatus and the communication apparatus is a gateway apparatus.

10. A communication system switching method according to claim 7, wherein the data communication network is an internet.

11. A communication system switching method according to claim 10, wherein the first communication system is a communication system via ITU recommendation T.38 and the second communication system is a communication system via ITU recommendation T.37.

12. A computer-readable memory medium for storing a program capable of executing a communication system switching method applied to a communication apparatus including an analogue terminal communication unit for effecting communication through an analogue circuit with an analogue communication terminal and a data communication network connecting unit for effecting connection to a data communication network, wherein said communication system switching method comprises:

a requesting step of requesting call establishment to the data communication network via a first communication system, when a sending request is received from the analogue communication terminal through the analogue circuit; and a receiving step of receiving a notice indicating that call establishment is possible from the data communication network corresponding to the call establishment request; and a communication executing step of executing the communication with the data communication network via a second communication system by switching the first communication system to the second communication system different from the first communication system and continuing the communication with the analogue communication terminal without disconnecting the communication of the analogue circuit, when the notice is not received in said receiving step.

13. A communication apparatus according to claim 1, wherein, when the notice is received by said receiving unit, said communication executing unit is adapted to execute the communication via the first communication system for connecting the analogue communication terminal with the data communication network.

14. A communication system switching method according to claim 7, wherein, when the notice is received in said receiving step, said communication executing step executes the communication via the first communication system for connecting the analogue communication terminal with the data communication network.

15. A communication apparatus including a communication unit for effecting communication through an analogue circuit with another communication terminal and a communication network connecting unit for effecting connection to a communication network, said apparatus comprising:

a requesting unit adapted to request call establishment to the communication network via a first communication system, when a sending request is received from the other communication terminal through the analogue circuit;

a receiving unit adapted to receive a notice indicating that call establishment is possible from the communication network corresponding to the call establishment request; and a communication executing unit adapted to execute the communication via the first communication system for connecting the other communication terminal with the communication network when the notice is received by said receiving unit, wherein said communication executing unit is adapted to execute the communication with the communication network via a second communication system by switching the first communication system to the second communication system different from the first communication system and is adapted to continue the communication with the other communication terminal without disconnecting the communication of the analogue circuit, when the notice is not received by said receiving unit.

16. A communication system switching method applied to a communication apparatus including a communication unit for effecting communication through an analogue circuit with another communication terminal and a communication network connecting unit for effecting connection to a communication network, said method comprising:

a requesting step of requesting call establishment to the communication network via a first communication system, when a sending request is received from the other communication terminal through the analogue circuit; and a receiving step of receiving a notice indicating that call establishment is possible from the communication network corresponding to the call establishment request; and a communication executing step of executing the communication via the first communication system for connecting the other communication terminal with the communication network when the notice is received in said receiving step, wherein said communication executing step executes the communication with the communication network via a second communication system by switching the first communication system to the second communication system different from the first communication system and continues the communication with the other communication terminal without disconnecting the communication of the analogue circuit, when the notice is not received in said receiving step.

17. A computer-readable memory medium for storing a program capable of executing a communication through an analogue circuit system switching method applied to a communication apparatus including a communication unit for effecting communication with another communication terminal and a communication network connecting unit for effecting connection to a communication network, wherein:

said communication system switching method comprises:

a requesting step of requesting call establishment to the communication network via a first communication system, when a sending request is received from the other communication terminal through the analogue circuit;

a receiving step of receiving a notice indicating that call establishment is possible from the communication network corresponding to the call establishment request; and a communication executing step of executing the communication via the first communication system for connecting the other communication terminal with the communication network when the notice is received in said receiving step, wherein said communication executing step executes the communication with the communication network via a second communication system by switching the first communication system to the second communication system different from the first communication system and continues the communication with the other communication terminal without disconnecting the communication of the analogue circuit, when the notice is not received in said receiving step.

18. A communication apparatus including a communication unit for effecting communication through an analogue circuit with another communication terminal and a communication network connecting unit for effecting connection to a data communication network, said apparatus comprising:

a requesting unit adapted to request call establishment to the data communication network via a first communication system, when a sending request is received from the other communication terminal through the analogue circuit;

a receiving unit adapted to receive a notice indicating that call establishment is possible from the data communication network corresponding to the call establishment request; and a communication executing unit adapted to execute the communication via the first communication system for connecting the other communication terminal with the data communication network, when the notice is received by said receiving unit, wherein said communication executing unit is adapted to execute the communication with the data communication network via a second communication system by switching the first communication system to the second communication system different from the first communication system and is adapted to continue the communication with the other communication terminal without disconnecting the communication of the analogue circuit to receive the data sent from the other communication terminal, to convert the sent data into an electronic mail, and to send the electronic mail to the data communication network, when the notice is not received by said receiving unit.

19. A communication system switching method applied to a communication apparatus including a communication unit for effecting communication through an analogue circuit with another communication terminal and a communication network connecting unit for effecting connection to a data communication network, said method comprising:

a requesting step of requesting call establishment to the data communication network via a first communication system, when a sending request is received from the other communication terminal through the analogue circuit;

a receiving step of receiving a notice indicating that call establishment is possible from the data communication network corresponding to the call establishment request; and a communication executing step of executing the communication via the first communication system for connecting the other communication terminal with the data communication network, when the notice is received in said receiving step, wherein said communication executing step executes the communication with the data communication network via a second communication system by switching the first communication system to the second communication system different from the first communication system and continues the communication with the other communication terminal without disconnecting the communication of the analogue circuit to receive the data sent from the other communication terminal, converts the sent data into an electronic mail, and sends the electronic mail to the data communication network, when the notice is not received in said receiving step.

20. A computer-readable memory medium for storing a program capable of executing a communication system switching method applied to a communication apparatus including a communication unit for effecting communication through an analogue circuit with another communication terminal and a communication network connecting unit for effecting connection to a data communication network, said method comprising:

a requesting step of requesting call establishment to the data communication network via a first communication system with, when a sending request is received from the other communication terminal through the analogue circuit;

a receiving step of receiving a notice indicating that call establishment is possible from the data communication network corresponding to the call establishment request; and a communication executing step of executing the communication via the first communication system for connecting the other communication terminal with the data communication network, when the notice is received in said receiving step, wherein said communication executing step executes the communication with the data communication network via a second communication system by switching the first communication system to the second communication system different from the first communication system and continues the communication with the other communication terminal without disconnecting the communication of the analogue circuit to receive the data sent from the other communication terminal, converts the sent data into an electronic mail, and sends the electronic mail to the data communication network, when the notice is not received in said receiving step.

* * * * *